(12) United States Patent
Chauhan et al.

(10) Patent No.: US 11,647,082 B2
(45) Date of Patent: May 9, 2023

(54) SYSTEM AND METHOD FOR MANAGING CENTRAL UNIT-USER PLANE LOCATIONS

(71) Applicant: Verizon Patent and Licensing Inc., Basking Ridge, NJ (US)

(72) Inventors: Maqbool Chauhan, Keller, TX (US); Sudhakar Reddy Patil, Flower Mound, TX (US); Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 118 days.

(21) Appl. No.: 17/214,696

(22) Filed: Mar. 26, 2021

(65) Prior Publication Data

US 2022/0311826 A1 Sep. 29, 2022

(51) Int. Cl.
*H04M 3/42* (2006.01)
*H04L 67/141* (2022.01)
*H04W 76/11* (2018.01)
*H04W 8/00* (2009.01)
*H04W 8/22* (2009.01)
*H04W 64/00* (2009.01)
*H04W 48/18* (2009.01)
*H04W 48/16* (2009.01)
*H04W 4/02* (2018.01)
*H04W 8/26* (2009.01)

(52) U.S. Cl.
CPC .......... *H04L 67/141* (2013.01); *H04W 4/025* (2013.01); *H04W 8/005* (2013.01); *H04W 8/22* (2013.01); *H04W 8/26* (2013.01); *H04W 48/16* (2013.01); *H04W 48/18* (2013.01); *H04W 64/003* (2013.01); *H04W 76/11* (2018.02)

(58) Field of Classification Search
CPC ..... H04L 67/141; H04W 76/11; H04W 4/025; H04W 8/005; H04W 8/22; H04W 8/26; H04W 48/16; H04W 48/18; H04W 64/003
See application file for complete search history.

(56) References Cited

U.S. PATENT DOCUMENTS

2019/0313479 A1* 10/2019 Myhre ................. H04W 80/12
2021/0100061 A1* 4/2021 Park ...................... H04W 76/27
2021/0282202 A1* 9/2021 Vikberg ............... H04W 76/12

OTHER PUBLICATIONS

Technical Specification: 5G; NG-RAN; NG Application Protocol (NGAP)(3GPP TS 38.413 version 15.0.0 Release 15) ETSI TS 138 413 V15.0.0 (Jul. 2018); 256 pages.

* cited by examiner

*Primary Examiner* — Justin Y Lee

(57) ABSTRACT

A first component may receive a message from a anchor selection component in a network. The message may include information that identifies a session anchor in the network and indicates a location of the session anchor. The first component may identify a managing component in the network based on the information and signal the managing component. The signaling may cause the managing component to be configured to forward data, from a mobile terminal attached to the network over a wireless link, to the session anchor.

20 Claims, 12 Drawing Sheets

SYSTEM AND METHOD FOR MANAGING CENTRAL UNIT-USER PLANE LOCATIONS

BACKGROUND INFORMATION

In contrast to other types of radio networks, advanced wireless radio networks, such as Fifth Generation (5G) radio access networks (NG-RAN), allow the function of a wireless station in the NG-RAN to be split into its constituent functional components: a Central Unit-Control Plane (CU-CP), a Central Unit User Plane (CU-UP), Distributed Units (DUs), and/or Radio Units (RUs). Such a split is aimed to increase flexibility in network design and to allow scalable and cost-effective network deployments. By splitting the functions of a wireless station, it is possible to tune particular performance parameters that depend on applications (e.g., gaming application, Voice-over-IP (VoIP) application, video streaming application, etc.) with different latency requirements. The performance parameters may be tuned based on the locations of the devices receiving the service, and/or on other variables.

DETAILED DESCRIPTION OF PREFERRED EMBODIMENTS

The following detailed description refers to the accompanying drawings. The same reference numbers in different drawings may identify the same or similar elements.

The systems and methods described herein relate to changing a path for network traffic, by selecting network nodes based on their geographical locations and inserting the selected nodes in the path to divert the traffic. In Fifth Generation (5G) networks, certain network components, such as an Application Function (AF), a Session Management Function (SMF), and/or a Policy Control Function (PCF), may steer traffic. Steering may be for network optimizations and to provide the optimum paths for user plane traffic, for meeting Service Level Agreement (SLA) requirements, etc. For example, in response to a message from a PCF, an SMF may insert a node in a data path, such as an uplink classifier (UL CL) node. The UL CL node may direct or steer traffic whose characteristics match filtering criteria specified by the SMF to a different data path.

Figure 1A:
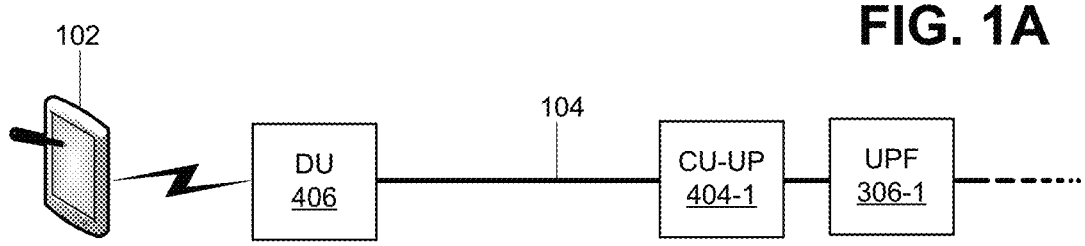
FIGS. 1A-1C illustrate concepts described herein.

The systems and methods described herein permit network functions to change traffic paths/routes, by selecting network nodes based on their geographical locations and inserting the selected nodes in the paths. By selecting and inserting the nodes based on their locations, the system may decrease latency associated with routes. FIGS. 1A though 1C illustrate the concepts described herein. As shown in FIG. 1A, a User Equipment device (UE) 102 establishes a session with an endpoint (not shown) over a DU 406, a CU-UP 404-1, and UPF 306-1. Each of DU 406, CU-UP 404-1, and UPF 306 is described below with reference to FIGS. 3 and 4. It is noted that although the link between UE 102 and DU 406 is established through a Radio Unit (RU) or other network elements, such network elements are not shown for simplicity. As depicted, the path includes a route segment 104, which carries traffic between DU 406 and CU-UP 404-1.

Figure 1B:
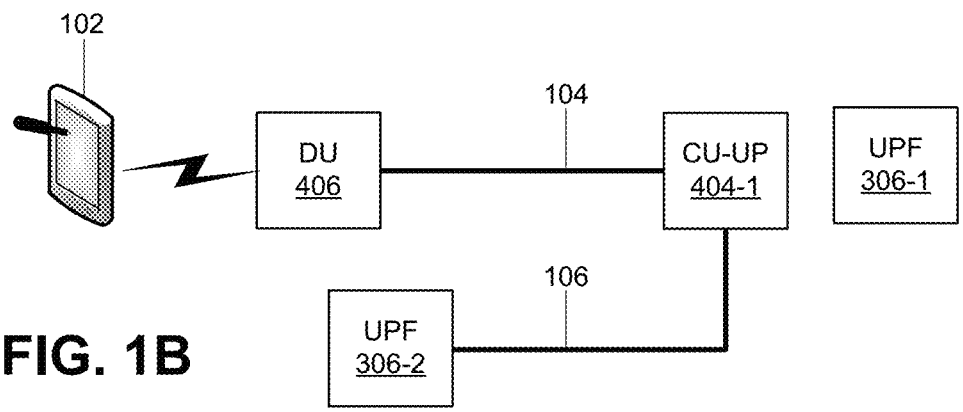

FIG. 1B illustrates diverting traffic away from UPF 306-1 to a different UPF 306-2. UPF 306-2 may be implemented as, for example, a UL CL node. As noted above, the system described herein may select a UPF 306-2 based on its physical location, so that UPF 306-2 can forward data from DU 406 to an endpoint for processing. However, if the system were to simply reconfigure CU-UP 404-1 so that it forwards the data, which CU-UP 404-1 receives from DU 406, to UPF 306-2 as shown in FIG. 1B, the new path 106 may introduce delays in conveying the data if CU-UP 404-1 is physically far from UPF 306-2. Accordingly, rather than just selecting UPF 306-2 and configuring CP-UP 404-1 to deliver data from UE 102 to an endpoint through UPF 306-2, the system also selects a CU-UP 404-2 (FIG. 1C) based on its location and configures the selected CU-UP 404-2, such that if CU-UP 404-2 receives data from UE 102 through DU 406, CU-UP 404-2 would forward the data to UPF 306-2. Furthermore, the system configures DU 406 so that DU 406 forwards the data from UE 102 to CU-UP 404-2, rather than to CU-UP 404-1.

Figure 1C:
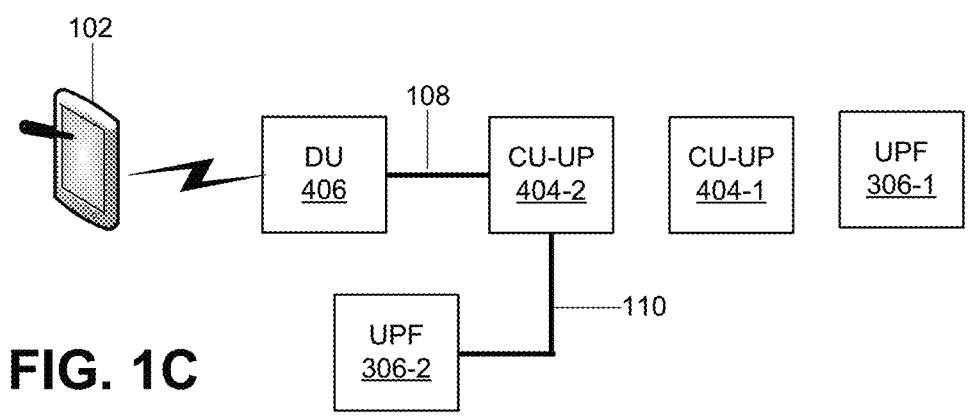

The result of the selections of UPF 306-2 and CU-UP 404-2 and the reconfiguration of DU 406 is shown in FIG. 1C. As depicted, when data from UE 102 arrives at DU 406, DU 406 forwards the data to CU-UP 404-2 over a new path 108, and CU-UP 404-2 forwards the data received from DU 406 to UPF 306-2. By selecting CU-UP 404-2 and UPF 306-2 based on their locations (e.g., proximity to DU 406) and inserting CU-UP 404-2 and UPF 306-2 in the data path, the system can minimize latency.

Figure 2:
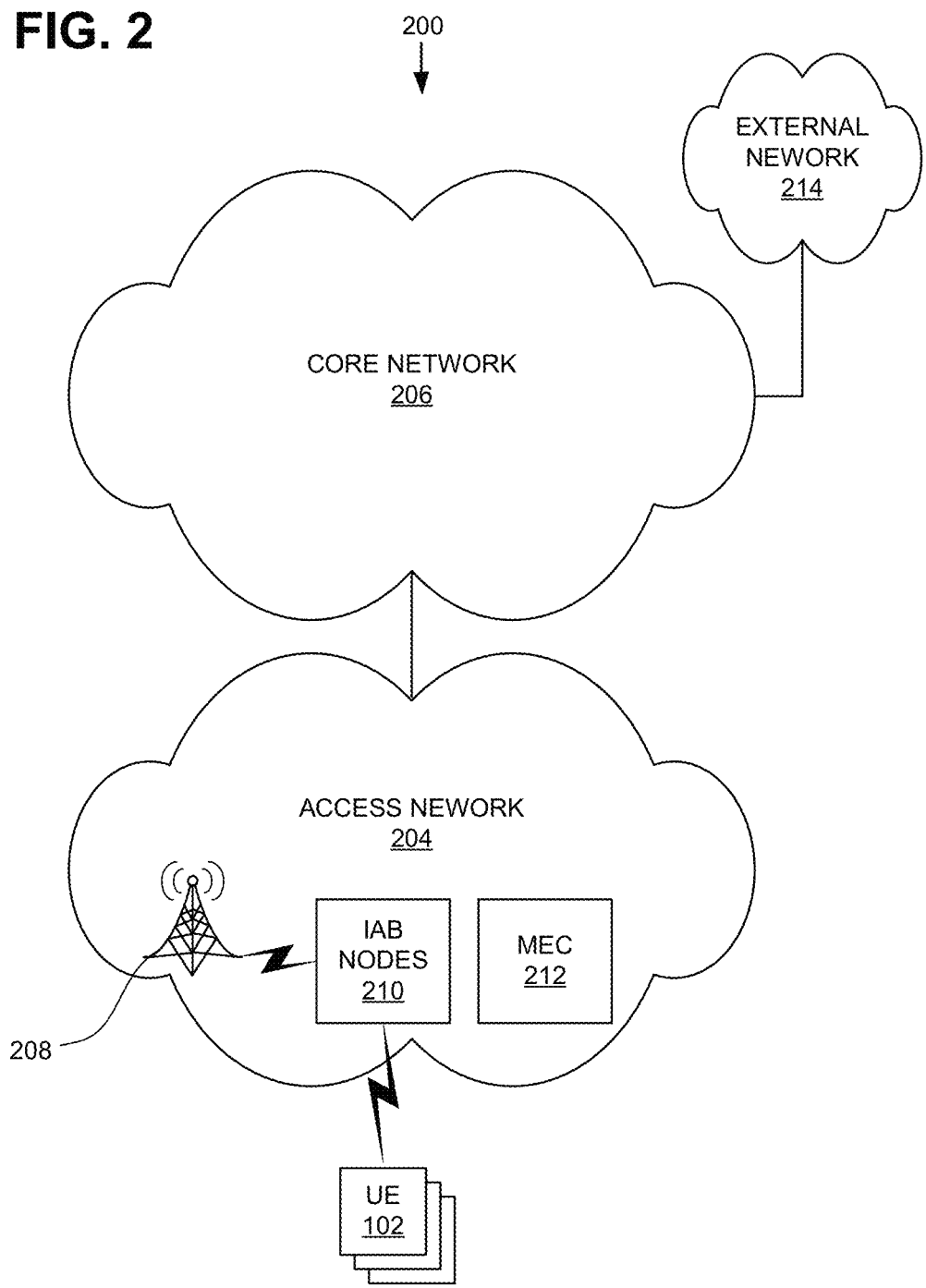
FIG. 2 illustrates an exemplary network environment in which the systems and methods described herein may be implemented.

FIG. 2 illustrates an exemplary network environment 200 in which the systems and methods described herein may be implemented. As shown, environment 200 may include UE 102 (also UEs 102), an access network 204, a core network 206, and an external network 214.

UE 102 may include a wireless communication device, a mobile terminal, or a fixed wireless access (FWA) device. Examples of UE 102 include: a smart phone; a tablet device;

a wearable computer device (e.g., a smart watch); a laptop computer; an autonomous vehicle with communication capabilities; a portable gaming system; and an Internet-of-Thing (IoT) device. In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 204.

Access network 204 may allow UE 102 to access core network 206. To do so, access network 204 may establish and maintain, with participation from UE 102, an over-the-air channel with UE 102; and maintain backhaul channels with core network 206. Access network 204 may convey information through these channels, from UE 102 to core network 206 and vice versa.

Access network 204 may include a Long-Term Evolution (LTE) radio network, a Fifth Generation (5G) radio network and/or another advanced radio network. These radio networks may operate in many different frequency ranges, including millimeter wave (mmWave) frequencies, sub 6 GHz frequencies, and/or other frequencies. Access network 204 may include many wireless stations and devices herein referred to as Integrated Access and Backhaul (IAB) nodes. In FIG. 2, these are depicted as a wireless station 208 and IAB nodes 210. Wireless station 208 and IAB nodes 210 may establish and maintain an over-the-air channel with UE 102 and backhaul channels with core network 206.

Wireless station 208 may include a Fourth Generation (4G), 5G, or another type of wireless station (e.g., evolved Node B (eNB), next generation Node B (gNB), etc.) that includes one or more Radio Frequency (RF) transceivers. In FIG. 2, wireless station 208 is depicted as receiving a backhaul wireless link from IAB nodes 210. A wireless station 208 that is attached to an IAB node via a backhaul link is herein referred to as IAB donor 208. As used herein, the term "IAB donor" refers to a specific type of IAB node. IAB donor 208 may have the capability to act as a router.

TAB nodes 210 may include one or more devices to relay signals from IAB donor 208 to UE 102 and from UE 102 to IAB donor 208. An TAB node 210 may have an access link with UE 102 and have a wireless and/or wireline backhaul link to other IAB nodes 210 and/or IAB donor 208. An TAB node 210 may have the capability to operate as a router, for exchanging routing information with IAB donor 208 and other TAB nodes 210 and for selecting traffic paths.

As further shown, access network 204 may include a Multi-Access Edge Computing (MEC) cluster 212. MEC cluster 212 may be located geographically close to wireless stations, and therefore also be close to UEs 102 serviced by the wireless station. Due to its proximity to UEs 102, MEC cluster 212 may be capable of providing services to UEs 102 with minimal latency. Depending on the implementations, MEC cluster 212 may provide many core network functions at network edges. In other implementations, MEC cluster 212 may be positioned at other locations (e.g., in core network 206) at which MEC cluster 212 can provide computational resources for improved performance.

Core network 206 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 206 may allow the delivery of Internet Protocol (IP) services to UE 102, and may interface with other networks, such as external network 214.

Depending on the implementation, core network 206 may include 4G core network components (e.g., a Serving Gateway (SGW), a Packet data network Gateway (PGW), a Mobility Management Entity (MME), etc.), 5G core network components (e.g., a User Plane Function (UPF), an Application Function (AF), an Access and Mobility Function (AMF), a Session Management Function (SMF), a Unified Data Management (UDM) function, a Network Slice Selection Function (NSSF), a Policy Control Function (PCF), etc.), or another type of core network components.

External network 214 may include networks that are external to core network 206. In some implementations, external network 214 may include packet data networks, such as an Internet Protocol (IP) network.

For simplicity, FIG. 2 does not show all components that may be included in network environment 200 (e.g., routers, bridges, wireless access point, additional networks, additional UEs 102, wireless station 208, IAB nodes 210, MEC clusters 212, etc.). Depending on the implementation, network environment 200 may include additional, fewer, different, or a different arrangement of components than those illustrated in FIG. 2. Furthermore, in different implementations, the configuration of network environment 200 may be different. For example, wireless station 208 may not be linked to IAB nodes 210 and may operate in frequency ranges (e.g., sub-6 GHz) different from or same as those used by IAB nodes 210 (e.g., mmWave or another frequency range).

Figure 6:
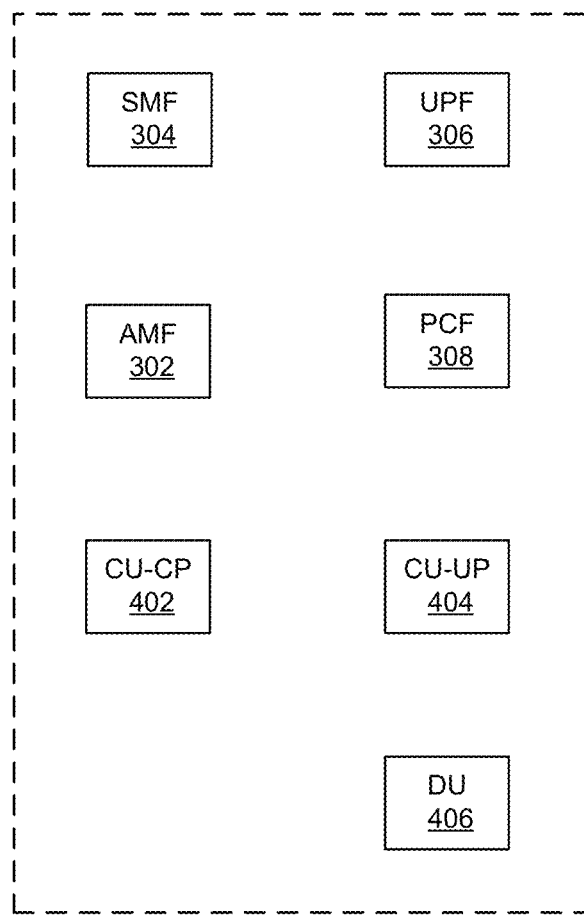
FIG. 6 illustrates exemplary functional components of the system, according to an implementation.
Figure 10:
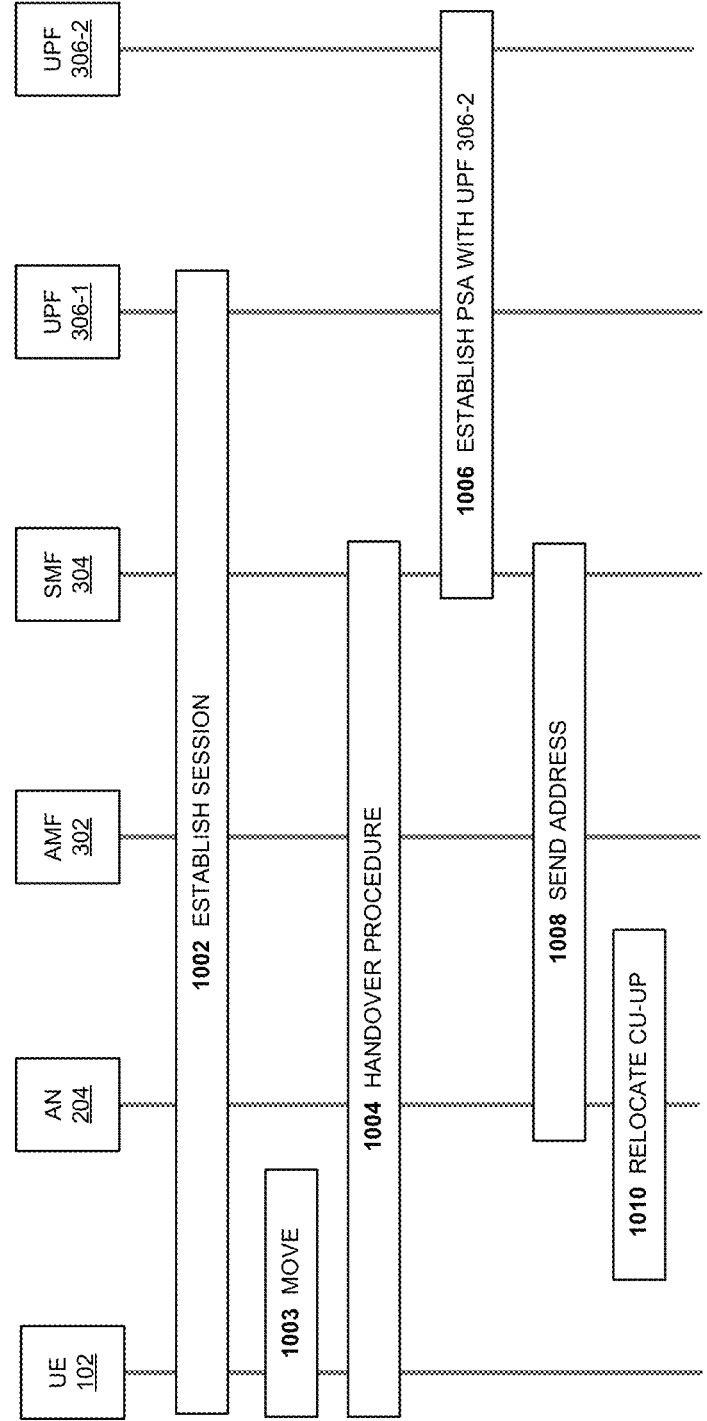
FIG. 10 is a processing diagram that is associated with modifying a traffic path between a UE and an endpoint when the UE moves from one location to another location.

As indicated above, network environment 200 may include the system for selecting and using network components, based on their physical locations, for rerouting traffic from UE 102 to different endpoints. FIGS. 6 and 10 (to be described below) show the components, of the system. Some of the components have been illustrated in FIGS. 1A-1C. Because the components of the system are also components of core network 206 and wireless station 208, the components are described with reference to the figures that depict the components of core network 206 and wireless station 208 (i.e., FIGS. 3 and 4).

Figure 3:
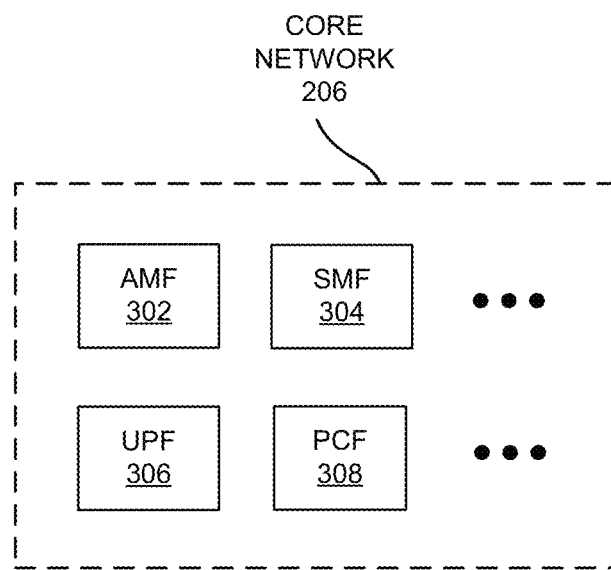
FIG. 3 illustrates exemplary functional components of a core network, according to an implementation.

FIG. 3 illustrates exemplary functional components of core network 206. In this implementation, core network 206 may include 5G core components, such as Access and Mobility Function (AMF) 302, a Session Management Function (SMF) 304, a User Plane Function (UPF) 306, and a Policy Control Function (PCF) 308. Depending on the implementation, core network 206 may include additional, fewer, or different core components than those illustrated in FIG. 3. Furthermore, depending on the implementation, through network slicing and network virtualization, core components 302-308 and other core components may be implemented in a data center or MEC cluster 212 in access network 204 or in external network 214—the core components may be integrated into networks other than core network 206.

AMF 302 may perform registration management, connection management, reachability management, mobility management, lawful intercepts, Short Message Service (SMS) transport between UE 102 and an SMS function (not shown), session management message transport between UE 102 and SMF 304, access authentication and authorization, location services management, management of non-3GPP access networks, and/or other types of management processes.

SMF 304 may perform session establishment, modification, and/or release, perform IP address allocation and management, perform Dynamic Host Configuration Protocol (DHCP) functions, perform selection and control of UPF 306, configure traffic steering at UPF 306 to guide traffic to the correct destination, terminate interfaces toward PCF 308, perform lawful intercepts, charge data collection, support charging interfaces, terminate session management of Non-Access Stratum (NAS) messages, perform downlink data notification, manage roaming functionality, and/or perform other types of control plane functions for managing user plane data.

UPF 306 may maintain an anchor point for intra/inter-Radio Access Technology (RAT) mobility, maintain an external protocol data unit (PDU) point of interconnect to a data network (e.g., external network 2 214), perform packet routing and forwarding, perform the user plane part of policy rule enforcement, perform packet inspection, perform lawful intercept, perform traffic usage reporting, perform Qualify-of-Service (QoS) handling in the user plane, perform uplink traffic verification, perform transport level packet marking, perform downlink packet buffering, send and forward an "end marker" to a radio access network node (e.g., gNB), and/or perform other types of user plane processes.

In some implementations, UPF 306 may load, from PCF 308, a Policy and Charging Control (PCC) rule that requires UPF 306 to redirect UE 102-originated IP data to a selected endpoint. After loading the PCC rule, UPF 306 may forward UE 102-originated IP data to the selected endpoint.

PCF 308 may support policies to control network behavior, provide policy rules to control plane functions (e.g., to SMF 304), access subscription information relevant to policy decisions, perform policy decisions, and/or perform other types of processes associated with policy enforcement. In some implementations, PCF 308 may include a PCC rule for a node to redirect UE 102-originated IP traffic to a selected endpoint.

Figure 4:
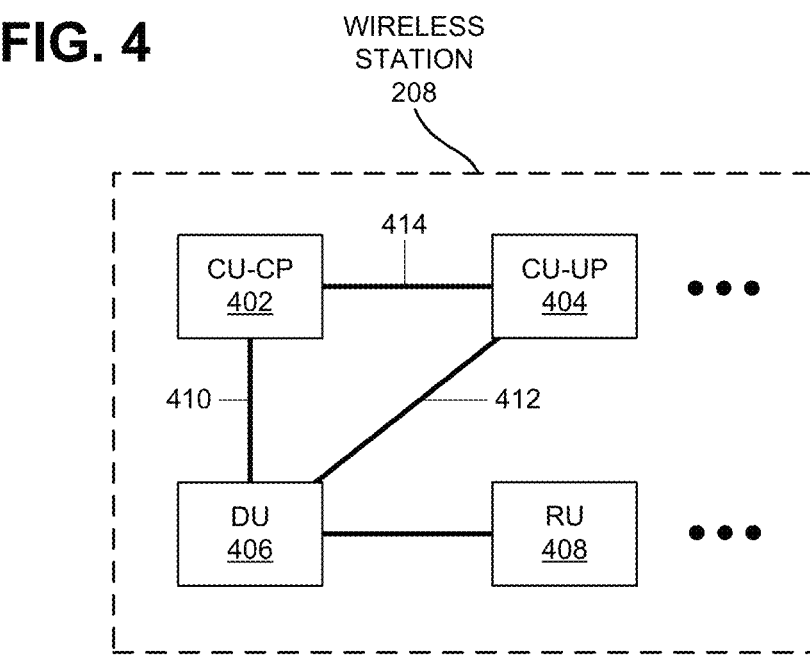
FIG. 4 illustrates an exemplary functional components of a wireless station, according to an implementation.

FIG. 4 illustrates an exemplary functional components of a wireless station 208. In FIG. 4, wireless station 208 is depicted as a 5G wireless station (e.g., gNB) and may include a Central Unit-Control Plane (CU-CP) 402, a Control Unit-User Plane (CU-UP) 404, a Distributed Unit (DU) 406, and a Radio Unit (RU) 408. Depending on the implementation, wireless station 208 may include additional, fewer, and/or different components than those illustrated in FIG. 4. For example, wireless station 208 may include multiple DUs 406 and RUs 408. Furthermore, although components 402-408 are depicted as being included in wireless station 208, each of components 402-408 may be implemented in access network 204 without being confined to a specific wireless station 208. Furthermore, CU-CP 402 and CU-UP 404 may be implemented in MEC cluster 212 or in a data center as part of a network slice through network function virtualization.

CU-CP 402 may perform control plane signaling associated with managing DU 406 over F1-C interface 410. CU-CP 402 may signal to DU 406 over a control plane communication protocol stack that includes, for example, F1AP (e.g., the signaling protocol for F1 interface between a CU and a DU). CU-CP 402 may include protocol layers comprising: Radio Resource Control (RRC) layer and a Packet Data Convergence Protocol-Control Plane (PDCP-C). DU 406 may include corresponding stacks to handle/respond to the signaling (not shown).

CU-UP 404 may perform user plane functions associated with managing DU 406 over F1-U interface 412. CU-UP 404 may interact with DU 406 over a user plane communication protocol stack that includes, for example, General Packet Radio Service Tunneling Protocol (GTP)-User plane, the User Datagram Protocol (UDP), and the IP. DU 406 would have corresponding layers to handle/respond to messages from CU-UP 404 (not shown). CP-UP 404 may include processing layers that comprise a Service Data Adaptation Protocol (SDAP) and a PDCP-User Plane (PDCP-U). CU-UP 404 and CU-CP 402 communicate over E1 interface, for example, for exchanging bearer setup messages.

Although CU-CP 402 and CU-UP 404 (collectively referred to as CU) and DU 406 are illustrated as part of wireless station 208, the CU-CP 402, CU-UP 404, and DU 406 do not need to be physically located close to one another, as CU-CP 402 and CU-UP 404 may be implemented as cloud computing elements, through network function virtualization capabilities of the cloud. A CU may communicate with the components of core network 206 through S1/NG interfaces and with other CUs through X2/Xn interfaces.

DU 406 may provide support for one or more cells covered by radio beams at the RU 408. DU 406 may handle UE mobility, from a DU to a DU, gNB to gNB, cell to cell, beam to beam, etc. RU 408 may perform physical layer functions, such as antenna functions, transmissions of radio beams, etc.

As indicated above, the system described herein permit network functions to change traffic paths/routes, by selecting network nodes based on their geographical locations and inserting the selected nodes in the paths. Some of the components of the system have been described above. In particular, DU 406 has been described above with reference to FIG. 4. DU 406 can be part of other network components, however. For example, DU 406 may be included in each of IAB nodes 210.

Figure 5A:
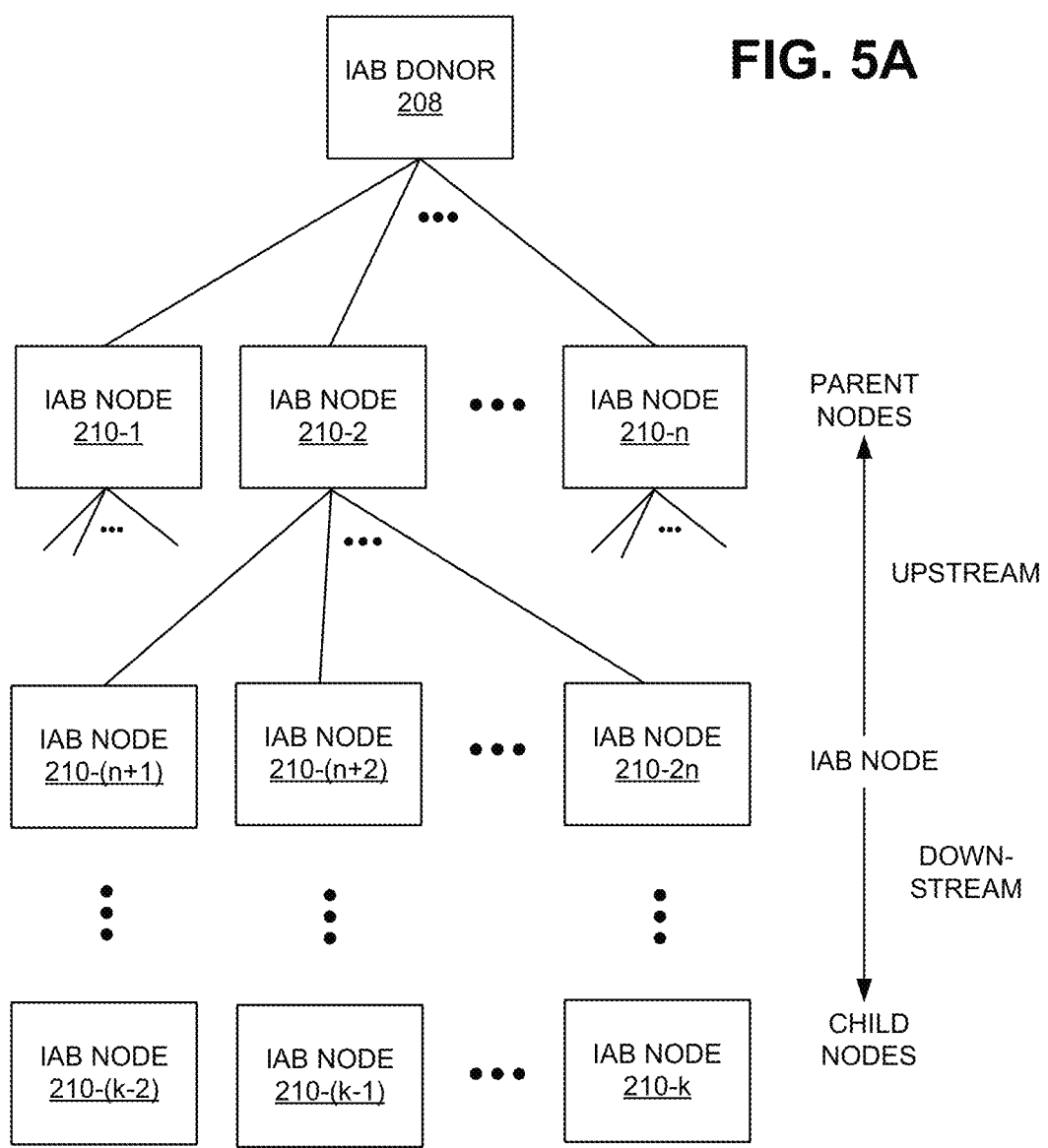
FIG. 5A illustrates an exemplary network layout of Integrated Access and Backhaul (IAB) nodes according to an implementation.

FIG. 5A illustrates an exemplary network layout of IAB nodes 210. As shown, some IAB nodes 210 may be attached to wireless station 208 (e.g., gNB), otherwise referred to as IAB donor 208, and to other IAB nodes 210 through backhaul links. Each IAB node 210 may have a parent node upstream (e.g., either a parent IAB node 210 or IAB donor 208) and a child node downstream (e.g., either a UE 102 or a child IAB node 210). An IAB node 210 that has no child IAB node 210 is herein referred to as a leaf IAB node 210. UE 102 may establish an access link with any of IAB nodes 210 and not just leaf IAB nodes 210.

Figure 5B:
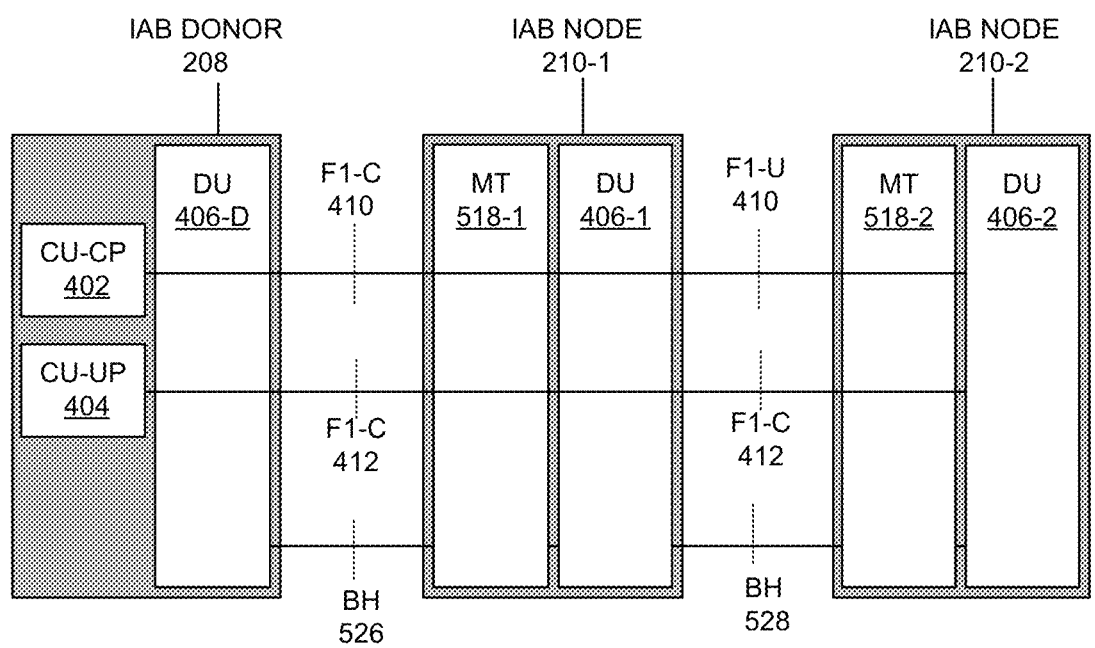
FIG. 5B illustrates exemplary functional components of IAB nodes and an IAB donor according to an implementation.

FIG. 5B illustrates exemplary functional components of IAB donor 208 and IAB nodes 210 in FIGS. 2 and 5A. In FIG. 5B, although only a single IAB node 210-1 is shown to be between IAB node 210-2 and IAB donor 208, in other embodiments, there may be many IAB nodes 210 between an IAB node 210-2 and IAB donor 208. Furthermore, although, FIG. 5B shows only a single path from IAB node 210-2 to IAB donor 208, there may be one or more paths from each IAB node 210-2 to IAB donor 208. As shown, IAB donor 208 includes CU-CP 402, CU-UP 404, and DU 406-D; IAB node 210-1 includes MT 518-1 and DU 406-1; and IAB node 210-2 includes MT 518-2 and DU 406-2.

In FIG. 5B, the control plane connections from CU-CP 402 and CU-UP 404 in IAB donor/wireless station 208 are shown as terminating at DU 406-2 in IAB node 114-2. However, for the path between IAB donor 208 and IAB node 210-1, CU-CP 402 and CU-UP 404 would terminate their connections at DU 406-1 in IAB node 210-1, although not shown in FIG. 5B.

Each of MTs 518-1 and 518-2 permits its host device to act like a mobile terminal (e.g., UE 102). For example, to DU 406-D in IAB donor 208, MT 518-1 in IAB node 210-1 behaves similarly as a mobile terminal wirelessly attached to DU 406-D. The relationship between MT 518-1 and DU 406-D, and between MT 518-2 and DU 406-1, is established over a Backhaul (BH) channel 526 between DU 406-D of IAB donor 208 and MT 518-1 of IAB node 210-1 and over BH channel 528 between DU 406-1 of IAB node 210-1 and MT 518-2 of IAB node 210-2.

Each of BH channels 526 and 528 in FIG. 5B includes multiple network layers that comprise, for example, a Backhaul Adaptation Layer (BAP), a Radio Link Control (RLC), a Media Access Control (MAC), and a Physical layer (PHY. These layers are not illustrated in FIG. 5B.

As BH channels may be RF channels, IAB nodes 210 may be part of access network 204 through wireless connections and therefore do not need to be interconnected through cables or optical fibers. In contrast to other wireless stations that are bound to access network 204 through cables or optical fibers, IAB nodes 210 may be placed in locations where cables or fibers are difficult to lay, and therefore, may easily provide access points for UEs 102. If necessary, IAB nodes 210 may be moved from one geographical location to another without re-cabling, as communication demands at different locations change.

FIG. 6 illustrates exemplary functional components of the system 600 for changing traffic paths/routes, by selecting network nodes based on their physical locations and inserting the selected nodes in the paths. As shown, system 600 may include AMF 302, SMF 304, UPF 306, PCF 308, CU-CP 402, CU-UP 404, and DU 406. Although system 600 may include multiple instances of AMF 302, SMF 304, UPF 306, PCF 308, CU-CP 402, CU-UP 404, and DU 406, they are not illustrated in FIG. 6. Also, depending on the implementation, system 600 may include fewer or additional components than those shown in FIG. 6. For example, in some implementations, system 600 may not include PCF 308 for setting network policies on selecting nodes for routing traffic based on the locations of the nodes. In another example, system 600 may include a Network Repository Function (NRF) for component registration and/or storing network component identifiers, location IDs, instance IDs, etc.

As part of system 600, PCF 308 may send messages to AMF 302 and/or SMF 304, indicating that AMF 302 and/or SMF 304 are to enforce location based selections of UPF 306 and CU-UP 404 for routing UE-originated data between DU 406 and an endpoint (e.g., an endpoint in MEC cluster 212, external network 214, or another network).

Figure 7:
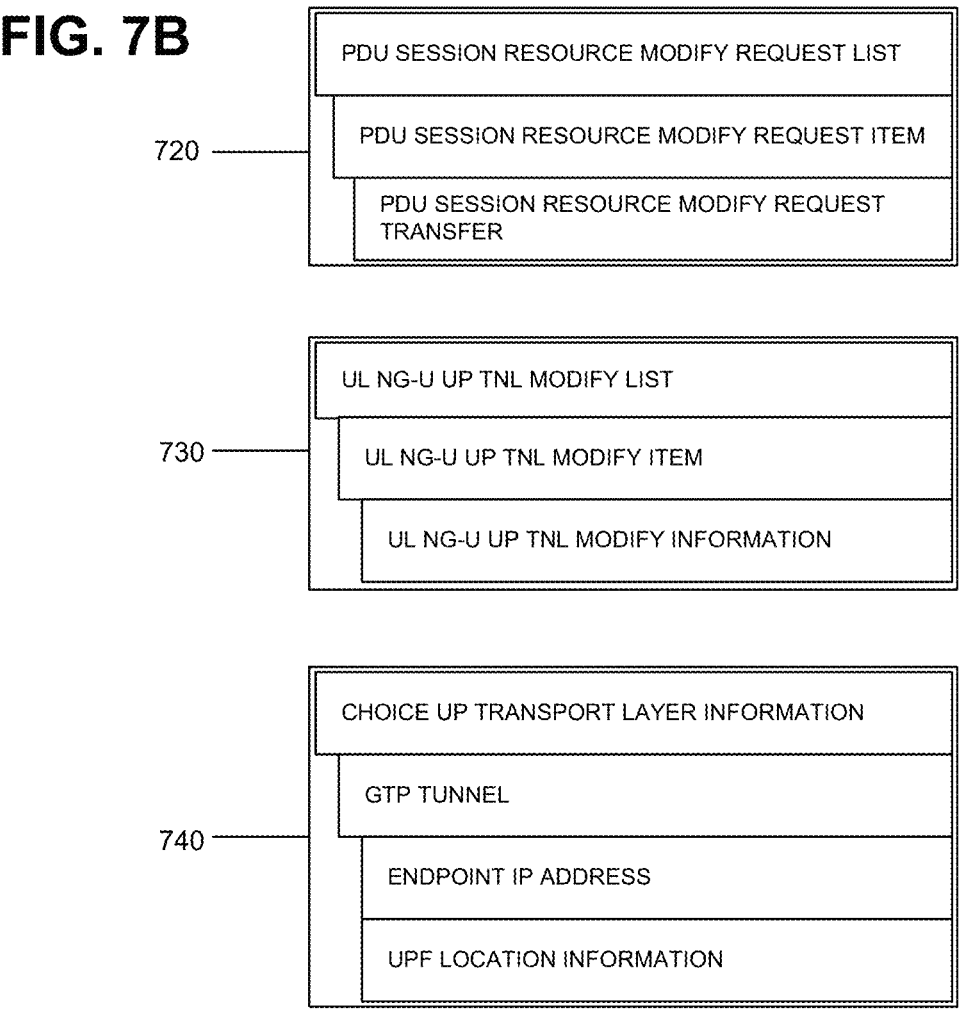
FIG. 7A shows exemplary fields of an Internet Protocol version 6 (IPv6) address, according to an implementation.
FIG. 7B illustrate a Protocol Data Unit (PDU) related message and Information Elements in the message.

As part of system 600, when SMF 304 receives the message from PCF 308, SMF 304 ensures that the Internet Protocol (IP) address fields of its messages to/from UPF 306 include location information or follows a particular format. In other implementations, UPF 306 may follow the format without receiving any message from SMF 304. FIG. 7A shows the format, according to an implementation. In FIG. 7A, the address 702 is an IP version 6 (IPv6) 702, which is 128 bits long. The IPv6 address 702 may include several fields, such as General Routing Prefix and Subnet Identifier (ID) field 704 and other fields that are implementation dependent. For the system described herein, the other fields include a location ID field 706, an Element ID field 708, a to-be-determined (TBD) field 710, and an Element Instance ID field 712.

General Routing Prefix and Subnet ID field 702 is 64 bits long and identifies the address of the network. Location ID field 706 includes a code (e.g., an alphanumeric value, a numeric value, etc.) that identifies the physical location of the source/destination. For example, if number 40 is a code for a particular location (e.g., a shelf location, a site location, an area location, etc.), and the network element that sent the message with the IPv6 address is at the location, then Location ID 706 may include number 40.

Element ID field 708 indicates a type of network function that is the source or the destination of the packet that carries the IPv6 address. For example, Element ID field 708 within an IPv6 address of a message from UPF 306 may indicate that the element type is "UPF." TBD field 710 may be yet to be determined. Element Instance ID field 712 may indicate a particular instance of an element type. For example, if there are 10 instances of UPF 306 implemented on hardware at a data site, each one of the UPF instances may be identified by the Element Instance ID. Element Instance ID field 712 may carry the element instance ID of the instance which sent the message with the IPv6 address that includes the Element Instance ID field 712.

Referring back to FIG. 6, after SMF 304 receives the messages from PCF 308 on selecting UPF 306 based on its location, SMF 306 may use Network Repository Function (NRF) (not shown) to determine the UPF 306 that is closest to a given site (e.g., a MEC cluster 212 site). At the NRF, a MEC cluster site can be referred to using Data Network Access Identifier (DNAI). Within NRF, each UPF 306 may be registered with DNAIs for the data networks (DNs) that the UPF 306 can support. In a different embodiment, SMF 304 may have locally stored information on UPFs 306 and the corresponding DNAIs.

In addition, when UPF 306 sends messages to other network components, the messages may include IPv6 source address whose Location ID field 706 indicates the location of the UPF 306. When SMF 304 receives messages from different UPFs 306, SMF 304 extracts the location IDs of UPFs 306 and stores the location IDs, along with corresponding IDs for the UPFs 306 (e.g., Element Instance IDs 712). Accordingly, SMF 304 builds a lookup table of locations for UPFs 306. Given an identifier or coordinates of a location, In system 600, a network component (e.g., PCF 308, AMF 302, etc.) may request SMF 304 to select a UPF 306 that can break out traffic to a particular edge site. In response to the request, SMF 304 may query the NRF or use the look up table of UPF locations, to identify a UPF 306 whose location is closest to a reference location provided by the requesting network component. Furthermore, SMF 304 may notify other network components about the location of the selected UPF 306. For example, SMF 304 may send a message to AMF 302 or to CU-CP 402, identifying the newly selected UPF 306 and its location. In system 600, a message that identifies the location of UPF 306 may include what is referred to herein as information Elements (IEs). Thus, if SMF 304 sends a message that indicates the location of UPF 308, the message may include IEs that specifically identify the location of the UPF 306.

The types of IEs that identify the location of UPF 306 may be included in various messages between network components of access network 204, core network 206, and/or external network 214. For example, in one implementation, SMF 304 may send a message, to CU-CP 402, requesting CU-CP 402 to modify its resources when SMF 304 selects a new UPF 306 based on its physical location. More specifically, SMF 304 may send a Protocol Data Unit (PDU) Session Resource Modify Request message. The message may include IEs that identify the location of a selected UPF 306, as well as other IEs.

FIG. 7B illustrates some IEs that are included in the PDU Session Resource Modify Request message 720. As shown, message 720 includes a list IE. The list IE is PDU SESSION RESOURCE MODIFY LIST. The list comprises other IEs, each of which is PDU SESSION RESOURCE MODIFY REQUEST ITEM. One of these IEs includes PDU SESSION RESOURCE MODIFY REQUEST TRANSFER. The IE indicates that the request for changing resource is for a transfer of a resource.

As further shown in FIG. 7B, PDU SESSION RESOURCE MODIFY REQUEST 730 in turn comprises an Uplink Next Generation to UE Transport Network Layer Modify List (UL NG-U TNL MODIFY LIST). The IE indicates that the transfer involves the transport layer connection between UE 102 and an endpoint. As further shown in FIG. 7B, UL NG-U TNL MODIFY LIST includes UL NG-U UP TNL MODIFY ITEMs. UL NG-U TNL MODIFY ITEM includes a UL NG-U TNL MODIFY INFORMATON. The IE identifies components of a tunnel.

As further shown, UL NG-U TNL MODIFY INFORMATION 7740 comprises a CHOICE User Plane (UP) TRANSPORT LAYER INFORMATION, which includes GTP TUNNEL. GTP TUNNEL in turn includes an ENDPOINT IP ADDRESS and a UPF LOCATION INFORMATION. These IEs include the IP address of the UPF 306 and location information (e.g., a location ID) associated with the UPF 306.

In FIG. 7B, not all IEs for PDU Session Resource Modify Request 720 are shown. Furthermore, not all IEs that are included in other IEs are shown. For example, the GTP TUNNEL may include IEs other than the ENDPOINT ADDRESS or the UPF LOCATION INFORMATION. Similarly, IE 730 may include IEs other than those shown in FIG. 7B.

Referring back to FIG. 6, CU-CP 402 may comprise a lookup table that indicates locations of CU-UPs 404. In other implementations, each of CU-UPs 404 is co-located with a corresponding UPF 306, and in such implementations, CU-CP 402 may not include or use a lookup table of locations for CU-UPs 404. When CU-CP 402 receives appropriate signaling (e.g., from AMF 302 or SMF 304), CU-CP 402 may send configuration information, over E1 interface, to CU-UP 404 that is co-located with a UPF 306 identified by the signaling. In a different implementation, CU-CP 402 may select a CU-UP 404 based on the location of CU-UP 404 and the location of the UPF 306 identified in the signaling, by using the lookup table of CU-UPs 404 and their location IDs.

Figure 8:
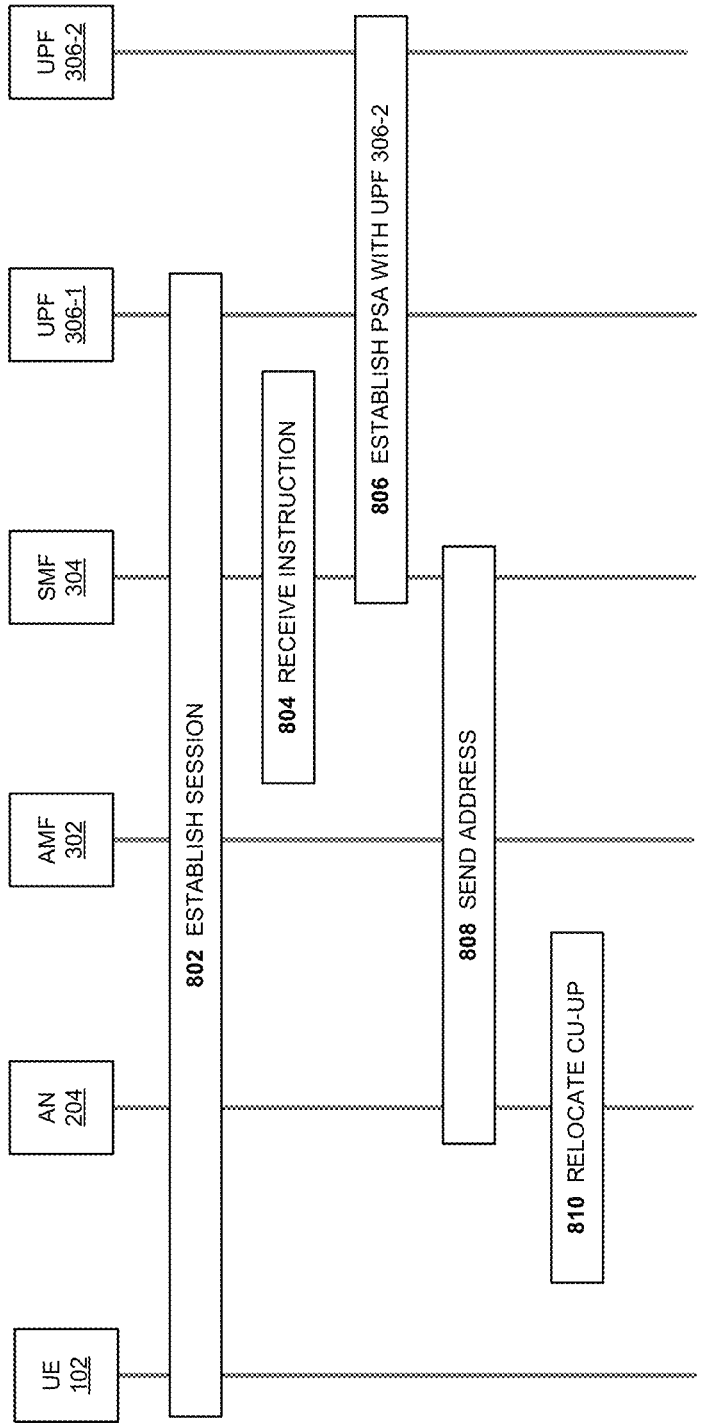
FIG. 8 is a processing diagram that is associated with modifying a traffic path between a User Equipment device (UE) and an endpoint.
Figure 9:
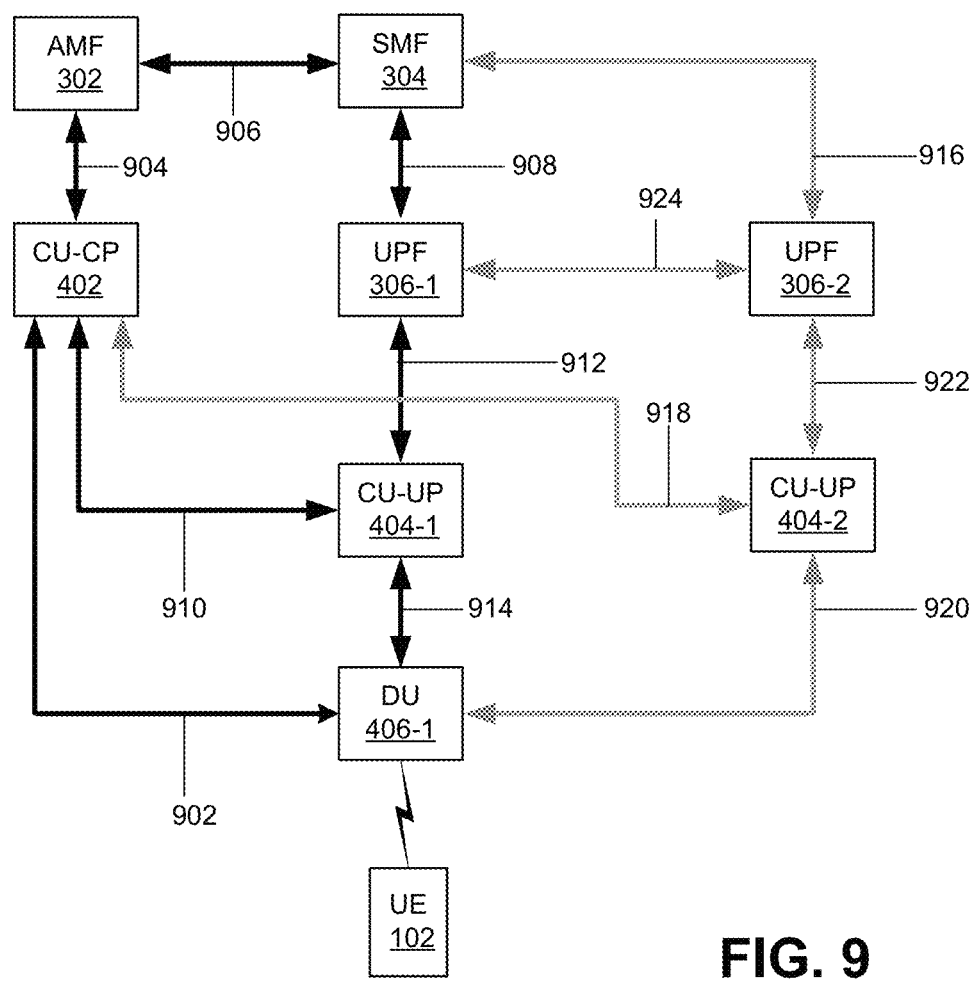
FIG. 9 depicts signaling and data paths between different network components for the system during the process of FIG. 8.

FIG. 8 is a processing diagram that is associated with system 600 modifying a traffic path between a UE 102 and an endpoint, by inserting a UPF 306 and CP-UP 404 in the path. FIG. 9 depicts signaling paths between different network components of system 600 during the process of FIG. 8. The process may be performed by various components of system 600.

As shown in FIG. 8, the process may begin with UE 102 establishing a connection with UPF 306-1 as a Protocol Data Unit session anchor (PSA) point (block 802). Through UPF 306-1, UE 102 may establish a session with an application in a network portion to which UPF 306-1 serves as a gateway.

Referring to FIG. 9, establishing the session may start with UE 102 establishing a connection with DU 406 over a Data Radio Bearer (DRB). When DU 406 receives a request for session from UE 102, DU 406 may send a UE context message to CU-CP 402 over path 902, over F1-C interface. A context message may include a DRB identifier (DRB ID or DRB #), possibly an identifier associated with a network slice, such as Single-Network Slice Selection Assistance Information (S-NSSAI) (provided by UE 102 in its session request), a QoS Flow level parameter, and/or other information. When CU-CP 402 receives the UE context and/or other information from a DU 406, CU-CP 402 may send a message to AMF 302 over path 904 (N4 interface) requesting a session establishment/modification. In one implementation, CU-CP 402 is aware of the identity of DU 406 that sent the message and may look up the physical location of DU 406. CU-CP 402 may store the location information for later use.

When AMF 302 receives the request for session from CU-CP 402, in response, AMF 302 may request, over path 906, SMF 304 to create or modify a session. Upon receipt of the message, SMF 304 may select a UPF 306-1 based on the endpoint with which UE 102 is to establish the session. SMF 304 may exchange signals with UPF 306-1 over path 908 to set UPF 306-1 as a PSA point. SMF 304 then messages AMF 302 about the UPF 306-1, indicating the location of UPF 306-1, in an IE within the message, over path 906.

After AMF 302 receives the message, AMF 302 may inform CU-CP 402 over path 904, that the anchor point is set. At this juncture, depending on the implementation, CU-CP 402 may be aware of the location of UPF 306-1 (if AMF 304 indicates the location of UPF 306-1 in its message through IEs). Furthermore, depending on the implementation, CU-CP 402 may select CU-UP 404-1 based on the locations of available CU-CPs 404 and the location of UPF 306-1 (e.g., by using its internal lookup table of CU-UPs 404 and their location information). For example, CU-CP 402 may select the CU-UP 404 that is closest to DU 406 and/or UPF 306-1. In other implementations, a default CU-UP 404-1 that is associated with UPF 306-1 may be selected, without accounting for the locations of CU-UPs 404 and/or UPF 306-1. After selecting CU-UP 404-1, CU-CP 402 may send a bearer context message over path 910 (E1 interface) so that CU-UP 404-1 can map the DRB to a particular flow path 912. Once the mapping is complete, the requested session can be established from UE 102 to the endpoint via UPF 306-1. Thereafter, CU-UP 404-1 can receive session data from DU 406 over path 914 (F1-U) and forward the data to UPF 306-1, over path 912. CU-UP 404-1 may also forward session data received from UPF 306-1 to DU 406. DU 406 may forward any uplink data to CU-UP 404 and downlink data to UE 102.

Referring back to FIG. 8, SMF 304 may receive a message from PCF 308 instructing SMF 304 to support a particular application (e.g., an application in MEC cluster 212) (block 804) for the established session and provide SMF 304 with a Data Network Access Identifier (DNAI) and/or a location ID associate d with the DN. In some implementations, given the DNAI, SMF 304 may be configured to lookup the location ID for the DNAI.

In response to the instruction from PCF 308, SMF 304 may select and establish a PSA point with UPF 306-2 (e.g., UL CL) that corresponds to the DNAI. In FIG. 9, after the receipt of the instruction from PCF 308, SMF 304 may exchange signals with UPF 306-2 over path 916, to set UPF 306-2 as a PSA point for the existing session. SMF 304 may store the IPv6 address of UPF 306-2 and/or its location ID (see FIG. 7A) for later use.

In addition to setting UPF 306-2 as a PSA point, SMF 304 may also signal UPF 306-1, to make any necessary configuration changes associated with UPF 306-1 so that UPF 306-1 no longer receives traffic from UE 102 through CU-UP 404-1 (e.g., tear down path 912). SMF 304 may signal UPF 306-1 to have UPF 306-1 receive traffic from UE 102 through UPF 306-2, and signal UPF 306-2 to forward some of the traffic from UE 102 to UPF 306-1.

Next, SMF 304 may send the IP address of UPF 306-2 (e.g., IPv6 address) (block 808) to access network 204. More specifically, SMF 304 may send the IP address of UPF 306-2 and/or its location information (e.g., location ID) to CU-CP 402 in a PDU Session Resource Modify Request 720 (FIG. 7A). As described above, the request 720 may include the IEs that convey the location information and/or the IPv6 address.

Access network 204 may select a CU-UP 404-2 in response to the SMF 304 signaling (block 810). More specifically, when CU-CP 402 in access network 204 receives the signal and the location information from SMF 304, CU-CP 402 may use the location information for UPF 306-2 and/or location information for DU 406, to identify a CU-UP 404-2 that is closest (e.g., geographically) to UPF 306-2 and/or DU 404. In a different implementation, a default CU-UP 404 for UPF 306-2 may exist, and in such an instance, CU-CP 402 may select the default CU-UP 404, as CU-UP 404-2. After the selection of CU-UP 404-2, CU-CP 402 may configure CU-UP 404-2, in a manner similar to that for configuring CU-UP 404-1, over path 918 (e.g., E1 interface). Once configured, CU-UP 404-2 may exchange data with DU 406 over path 920 (F1-U) and with UPF 306-2 over path 922. Furthermore, CU-CP 402 may signal CU-UP 404-1 so that CU-CP 404-1 no longer relays data between DU 406 and UPF 306-1. CU-UP 404-1 may release any resources it allocated for relaying the data.

Figure 11:
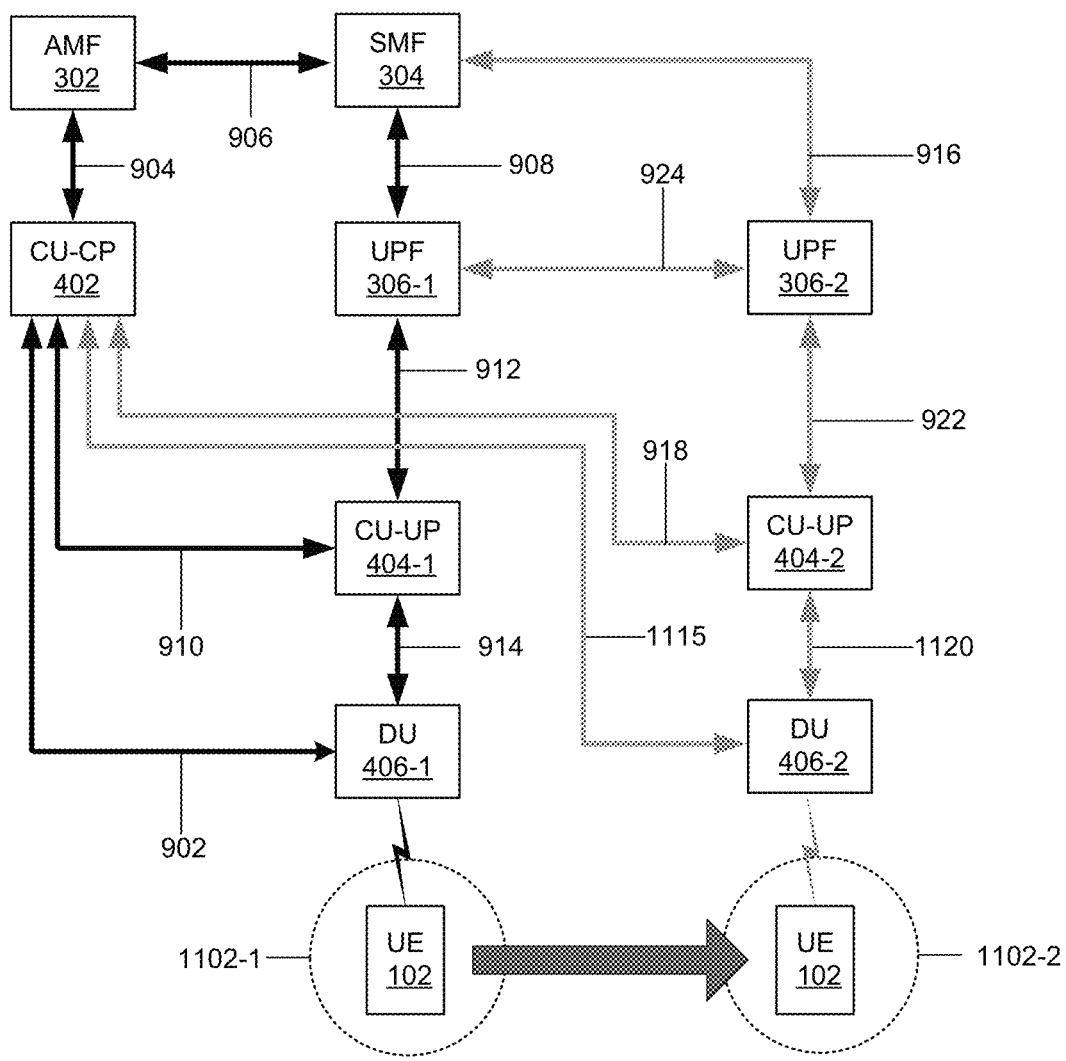
FIG. 11 depicts signaling and data paths between different network components for the system during the process of FIG. 10.

FIG. 10 shows a processing diagram that is associated with modifying a UP traffic path between UE 102 an endpoint when UE 102 moves from one location to another location. FIG. 11 depicts signaling paths between different network components for system 600 during the process of FIG. 10. The process may be performed by various components of system 600.

As shown in FIGS. 10 and 11, the process may begin with UE 102 at location 1102-1 establishing a connection with UPF 306-1 as a PSA point (block 1002). For block 1002, the signaling between the components of system 600 as shown in FIG. 11 are similar to those illustrated in FIG. 9 for block 802, except that in FIG. 11, DU 406-1 replaces DU 406 in FIG. 9. After establishing the session, UE 102 then moves to location 1102-2 (block 1003), causing various network components to proceed with a handover process (block 1004).

Referring to FIG. 11, the handover may start with UE 102 establishing a connection with DU 406-2 over a DRB. When DU 406-2 receives a request for session from UE 102, DU 406-2 may send a UE context message to CU-CP 402 over path 1105, over F1-C interface. A context message may include a DRB identifier (DRB ID or DRB #), possibly an identifier associated with a network slice, such as S-NSSAI (provided by UE 102 in its session request), a QoS Flow level parameter, and/or other information. When CU-CP 402 receives the UE context and/or other information from a DU 406, CU-CP 402 may send a message to AMF 302 over path 904 (N4 interface) requesting a session modification. In one implementation, CU-CP 402 is aware of the identity of DU 406-2 that sent the context message and may look up the physical location of DU 406-2. CU-CP 402 may store the location information for later use.

When AMF 302 receives the request for session from CU-CP 402, AMF 302 may request, over path 906, SMF 304 to modify or create a session. In FIG. 10, after the receipt of the request from AMF 302, SMF 304 may exchange signals with UPF 306-2 over path 916, to set UPF 306-2 as a PSA point for the session (block 1006). SMF 304 may store the IPv6 address of UPF 306-2 and/or its location ID (see FIG. 7A) for later use.

In addition to setting UPF 306-2 as the PSA point, SMF 304 may also signal UPF 306-1, to make any necessary configuration changes associated with UPF 306-1 so that UPF 306-1 no longer receives traffic from UE 102 through CU-UP 404-1 (e.g., tear down path 912). SMF 304 may signal UPF 306-1 to have UPF 306-1 receive none or some of the traffic from UE 102 through UPF 306-2, and signal UPF 306-2 to forward some of the traffic from UE 102 to UPF 306-1, over path 924.

Next, SMF 304 may reply to AMF 302, indicating that the session has been modified. SMF 304 may send, in the reply, the IEs that include the IP address of UPF 306-2 (e.g., IPv6 address) and/or UPF 306-2 location ID (block 1008). In response, AMF 302 may send a message to CU-CP 402, indicating that the session is modified. The message may include the IEs which indicate the IPv6 address of UPF 306-2 and/or location information for UPF 3065-2 (block 1008).

Access network 204 may select a CU-UP 404-2 in response to the AMF 304 reply (block 1010). More specifically, when CU-CP 402 in access network 204 receives the signal and the location information from AMF 302, CU-CP 402 may use the location information for UPF 306-2 and the location information for DU 406-2, to identify a CU-UP 406-2 that is closest to UPF 306-2 and/or DU 406-2 (e.g., by using its internal table of CU-UPs 404 and their locations). In a different implementation, a default CU-UP 404 for UPF 306-2 may exist, and in such an instance, CU-CP 402 may select the default CU-UP 404, as CU-UP 404-2. After the selection of CU-UP 404-2, CU-CP 402 may configure CU-UP 404-2, in a manner similar to that for configuring CU-UP 404-1, over path 918 (e.g., E1 interface). In addition, CU-CP 402 may send a reply to the UE context message sent by DU 404-2.

Once configured, CU-UP 404-2 may exchange data with DU 406-2 over path 1120 (F1-U) and with UPF 306-2 over path 922. Furthermore, CU-CP 402 may signal CU-UP 404-1 so that CU-CP 404-1 no longer relays data between DU 406-1 and UPF 306-1. CU-UP 404-1 may release any resources it allocated for relaying the data.

Figure 12:
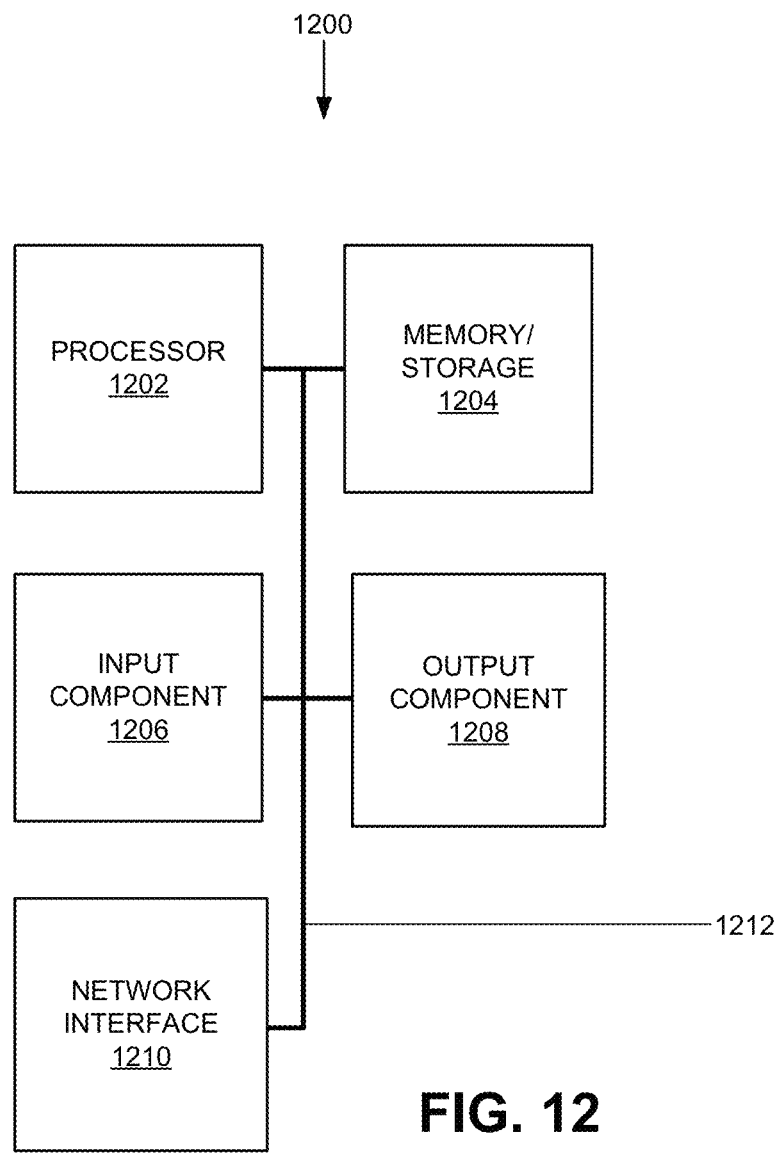
FIG. 12 depicts exemplary components of an exemplary network device, according to an implementation.

FIG. 12 depicts exemplary components of an exemplary network device 1200. Network device 1200 corresponds to or is included in UE 102, IAB nodes 210, and any of the network components of FIGS. 1-6 and 8-11 (e.g., a router, a network switch, servers, gateways, wireless stations 208, MEC cluster 212, CU-CP 402, CU-UP 404, DU 406, CU, etc.). As shown, network device 1200 includes a processor 1202, memory/storage 1204, input component 1206, output component 1208, network interface 1210, and communication path 1212. In different implementations, network device 1200 may include additional, fewer, different, or a different arrangement of components than the ones illustrated in FIG. 12. For example, network device 1200 may include a display, network card, etc.

Processor 1202 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 1200 and/or executing programs/instructions.

Memory/storage 1204 may include static memory, such as read only memory (ROM), and/or dynamic memory, such as random access memory (RAM), or onboard cache, for storing data and machine-readable instructions (e.g., programs, scripts, etc.).

Memory/storage 1204 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 1204 may be external to and/or removable from network device 1200. Memory/storage 1204 may include, for example, a Universal Serial Bus (USB) memory stick, a dongle, a hard disk, off-line storage, a Blu-Ray® disk (BD), etc. Memory/storage 1204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 1206 and output component 1208 may provide input and output from/to a user to/from network device 1200. Input and output components 1206 and 1208 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 1200.

Network interface 1210 may include a transceiver (e.g., a transmitter and a receiver) for network device 1200 to communicate with other devices and/or systems. For example, via network interface 1210, network device 1200 may communicate with wireless station 208.

Network interface 1210 may include an Ethernet interface to a LAN, and/or an interface/connection for connecting network device 1200 to other devices (e.g., a Bluetooth interface). For example, network interface 710 may include a wireless modem for modulation and demodulation.

Communication path 1212 may enable components of network device 1200 to communicate with one another.

Network device 1200 may perform the operations described herein in response to processor 1202 executing software instructions stored in a non-transient computer-readable medium, such as memory/storage 1204. The software instructions may be read into memory/storage 1204 from another computer-readable medium or from another device via network interface 1210. The software instructions stored in memory or storage (e.g., memory/storage 1204, when executed by processor 1202, may cause processor 1202 to perform processes that are described herein. For example, UE 102, AMF 302, SMF 304, UPF 306, wireless station/IAB donor 208, IAB nodes 210, CU-CP 402, CU-UP 404, and DU 406 may each include various programs for performing some of the above-described functions and processes.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks have been described above with regard to the process illustrated in FIGS. 8 and 10, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A component comprising:
a processor configured to:
receive a message from an anchor selection component in a network, wherein the message includes information that identifies a session anchor in the network and indicates a first geographical location of the session anchor;
identify a managing component for user plane functions of a physical layer of the network based on the information and a second geographical location of a mobile terminal; and
signal the managing component, wherein the signaling causes the managing component to be configured to forward data, from the mobile terminal attached to the network over a wireless link, to the session anchor.

2. The component of claim 1, wherein the component comprises a Central Unit-Control Plane (CU-CP), wherein the managing component comprises a Central Unit-User Plane (CU-UP), and wherein the session anchor comprises a User Plane Function (UPF).

3. The component of claim 1, wherein the information includes one or more of:

an information element that includes an Internet Protocol version 6 (IPv6) address of the session anchor; or an information element that indicates the first geographical location of the session anchor.

4. The component of claim 3, wherein the IPv6 address includes:
a field identifying the session anchor as a type of network function; and
another field that includes an identifier (ID) for the first geographical location of the session anchor.

5. The component of claim 1, wherein the message includes a request to modify session resources.

6. The component of claim 1, wherein the information is provided to the anchor selection component in a prior message sent from a Session Management Function (SMF) to the anchor selection component.

7. The component of claim 1, wherein when the processor identifies the managing component based on the information, the processor is configured to:
identify the first geographical location of the session anchor; and
identify a Central Unit-User Plane (CU-UP) as the managing component, wherein the CU-UP is located closest to at least one of:
the session anchor; or
a distributed unit (DU) through which the mobile terminal is attached to the network.

8. The component of claim 1, wherein when the processor identifies the managing component based on the information, the processor is configured to:
identify, as the managing component, a default Central Unit-User Plane (CU-UP) associated with the session anchor.

9. A method comprising:
receiving, at a first component, a message from an anchor selection component in a network, wherein the message includes information that identifies a session anchor in the network and indicates a first geographical location of the session anchor;
identifying a managing component for user plane functions of a physical layer of the network based on the information and a second geographical location of a mobile terminal; and
signaling the managing component, wherein the signaling causes the managing component to be configured to forward data, from the mobile terminal attached to the network over a wireless link, to the session anchor.

10. The method of claim 9, wherein the first component comprises a Central Unit-Control Plane (CU-CP), wherein the managing component comprises a Central Unit-User Plane (CU-UP), and wherein the session anchor comprises a User Plane Function (UPF).

11. The method of claim 9, wherein the information includes one or more of:
an information element that includes an Internet Protocol version 6 (IPv6) address of the session anchor; or
an information element that indicates the first geographical location of the session anchor.

12. The method of claim 11, wherein the IPv6 address includes:
a field identifying the session anchor as a type of network function; and
another field that includes an identifier (ID) for the first geographical location of the session anchor.

13. The method of claim 9, wherein the message includes a request to modify session resources.

14. The method of claim 9, wherein the information is provided to the anchor selection component in a prior message sent from a Session Management Function (SMF) to the anchor selection component.

15. The method of claim 9, wherein identifying the managing component based on the information comprises:
identifying the first geographical location of the session anchor; and
identifying a Central Unit-User Plane (CU-UP) as the managing component, wherein the CU-UP is located closest to at least one of:
the session anchor; or
a distributed unit (DU) through which the mobile terminal is attached to the network.

16. The method of claim 9, wherein identifying the managing component based on the information comprises:
identifying, as the managing component, a default Central Unit-User Plane (CU-UP) associated with the session anchor.

17. A non-transitory computer-readable medium comprising processor-executable instructions, when executed by a processor, causes the processor to:
receive a message, at a first component, from an anchor selection component in a network, wherein the message includes information that identifies a session anchor in the network and indicates a first geographical location of the session anchor;
identify a managing component for user plane functions of a physical layer of the network based on the information and a second geographical location of a mobile terminal; and
signal the managing component, wherein the signaling causes the managing component to be configured to forward data, from the mobile terminal attached to the network over a wireless link, to the session anchor.

18. The non-transitory computer-readable medium of claim 17, wherein the first component comprises a Central Unit-Control Plane (CU-CP), wherein the managing component comprises a Central Unit-User Plane (CU-UP), and wherein the session anchor comprises a User Plane Function (UPF).

19. The non-transitory computer-readable medium of claim 17, wherein the information includes one or more of:
an information element that includes an Internet Protocol version 6 (IPv6) address of the session anchor; or
an information element that indicates the first geographical location of the session anchor.

20. The non-transitory computer-readable medium of claim 19, wherein the IPv6 address includes:
a field identifying the session anchor as a type of network function; and
another field that includes an identifier (ID) for the first geographical location of the session anchor.

* * * * *